US006802370B1

(12) United States Patent
Garigan et al.

(10) Patent No.: US 6,802,370 B1
(45) Date of Patent: Oct. 12, 2004

(54) PERSONAL COOLING SYSTEM FOR SHIPBOARD FIREFIGHTERS

(75) Inventors: Meave Garigan, Panama City, FL (US); John Kady, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 121 days.

(21) Appl. No.: 10/230,443

(22) Filed: Aug. 27, 2002

(51) Int. Cl.[7] ........................ G05D 16/00; A62B 17/00
(52) U.S. Cl. ........................................... 165/281; 2/458
(58) Field of Search ...................... 165/281, 46; 2/458; 239/289; 62/259.3; 128/847

(56) References Cited

U.S. PATENT DOCUMENTS

| | | | | | |
|---|---|---|---|---|---|
| 3,972,373 | A | * | 8/1976 | Nichols et al. | 239/112 |
| 4,090,509 | A | * | 5/1978 | Smith | 128/202.19 |
| 4,974,584 | A | * | 12/1990 | Goodnoe | 239/270 |
| 5,064,392 | A | * | 11/1991 | Wonders | 440/39 |
| 5,167,227 | A | * | 12/1992 | Meserlian | 601/151 |
| 5,396,885 | A | * | 3/1995 | Nelson | 137/343 |
| 5,437,199 | A | * | 8/1995 | Kaplan | 73/863.23 |
| 5,570,685 | A | * | 11/1996 | Turiello | 128/202.13 |
| 5,572,880 | A | * | 11/1996 | Frustaci et al. | 62/259.3 |
| 5,678,542 | A | * | 10/1997 | Maffatone | 128/205.24 |
| 5,689,968 | A | * | 11/1997 | Frustaci et al. | 62/259.3 |
| 5,774,902 | A | * | 7/1998 | Gehse | 2/458 |
| 6,009,953 | A | * | 1/2000 | Laskaris et al. | 169/13 |
| 6,085,586 | A | * | 7/2000 | Arvidson et al. | 73/201 |
| 6,209,144 | B1 | * | 4/2001 | Carter | 2/458 |
| 6,347,627 | B1 | * | 2/2002 | Frankie et al. | 128/201.21 |

* cited by examiner

*Primary Examiner*—Ljiljana Ciric
(74) *Attorney, Agent, or Firm*—James T. Shepherd; Donald G. Peck

(57) ABSTRACT

A method and apparatus for reducing heat stress in firefighters supplies pressurized cooling water at a first pressure from a hose connected to a fire main for fighting fires onboard a ship. A manifold block switches parts of the pressurized cooling water at the first pressure through on/off valves and reduces pressure of the parts of the pressurized cooling water at the first pressure to a second pressure in flow regulators. The parts of the pressurized cooling water at the second pressure are fed through feeder hoses connected to the flow regulators and are conducted from the feeder hoses through tube suits each worn by a firefighter. Heat stress is reduced for each firefighter in each tube suit by the conducted parts of pressurized cooling water at the second pressure. The feeder hoses provide cooling water through each tube suit while the firefighters fight fires and during rest periods.

25 Claims, 3 Drawing Sheets

PERSONAL COOLING SYSTEM FOR SHIPBOARD FIREFIGHTERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an aid for firefighters. More particularly, this invention is to a method and system for improved safety, performance, and comfort for a firefighter.

Currently, there is no official system used by the U.S. Navy to provide personal cooling for shipboard firefighters. Since shipboard fires are typically more intense than conventional fires at land-based facilities, harmful levels of exposure and heat-related injuries are more likely to occur.

Heat stress is a critical problem in fighting fires, in both the military and civilian sector. During a fire, firefighters typically have at least a fifteen-minute rest period between exiting and re-entering a fire. Since these firefighters may remain in full gear while on stand-by, heat-related fatigue can soon develop. Due to the critical nature of quickly controlling and extinguishing fires aboard ships, equipment that enhances the safety, productivity and comfort of the firefighters is valuable and significant.

Thus, in accordance with this inventive concept, a need has been recognized in the state of the art for a system including a suit worn by a firefighter onboard a ship that interfaces with onboard coolant sources to relieve heat stress to improve the safety, performance, and comfort of one or more firefighters.

OBJECTS AND SUMMARY OF THE INVENTION

An object of the invention is to provide a method and system for simultaneously relieving heat-related fatigue and injury of different numbers of firefighters.

Another object of the invention is to provide a method and system for relieving heat stress for firefighters connected to a common source of pressurized cooling water.

Another object of the invention is to provide method and system for simultaneously cooling firefighters connected to a pressurized coolant supply aboard a ship.

Another object is to provide a method and system coupling tube suits worn by firefighters with pressurized cooling water supplies on a ship.

Another object of the invention is to provide cooling to relieve heat-related stress and injury for firefighters and/or damage control personnel combating intense fires on a ship.

Another object of the invention is to provide a cost-effective method and system providing sufficient cooling and thermal regulation to prevent and relieve heat stress using proven commercial off-the-shelf components.

Another object of the invention is to provide a method and system including tube suits worn by firefighters and/or damage control personnel to simultaneously relieve heat stress while fighting fires and during periods of rest and stand-by.

Another object of the invention is to provide a method and system to interface tube suits worn by firefighters with a pressurized coolant source or hose being used to fight fires.

Another object of the invention is to provide a method and system to relieve heat stress of firefighters and operate within protocol for fighting fires and existing ship configurations of the U.S. Navy.

Another object of the invention is to provide a method and system using resources and infrastructure aboard a ship to reduce the need for additional equipment and cool numbers of firefighters for as long as needed.

Another object of the invention is to reduce heat stress of a firefighter in a tube suit by heat transfer between the firefighter and pressurized cooling water conducted at a second, or lower pressure.

These and other objects of the invention will become more readily apparent from the ensuing specification when taken in conjunction with the appended claims.

Accordingly, the present invention is to a method and system for relieving heat stress for firefighters. Pressurized cooling water is supplied at a first pressure from a hose connected to a fire main for fighting fires onboard a ship. A manifold block switches parts of the pressurized cooling water at the first pressure through on/off valves and reduces the pressure of the parts of the pressurized cooling water at the first pressure to a second pressure in flow regulators. The parts of the pressurized cooling water at the second pressure are fed through feeder tubes connected to the flow regulators and are conducted from the feeder tubes through tube suits each worn by a firefighter. The method and system of the invention reduces heat stress for each firefighter in each tube suit by the conducted parts of the pressurized cooling water at the second pressure.

DESCRIPTION OF THE PREFERRED EMBODIMENTS

Figure 1:
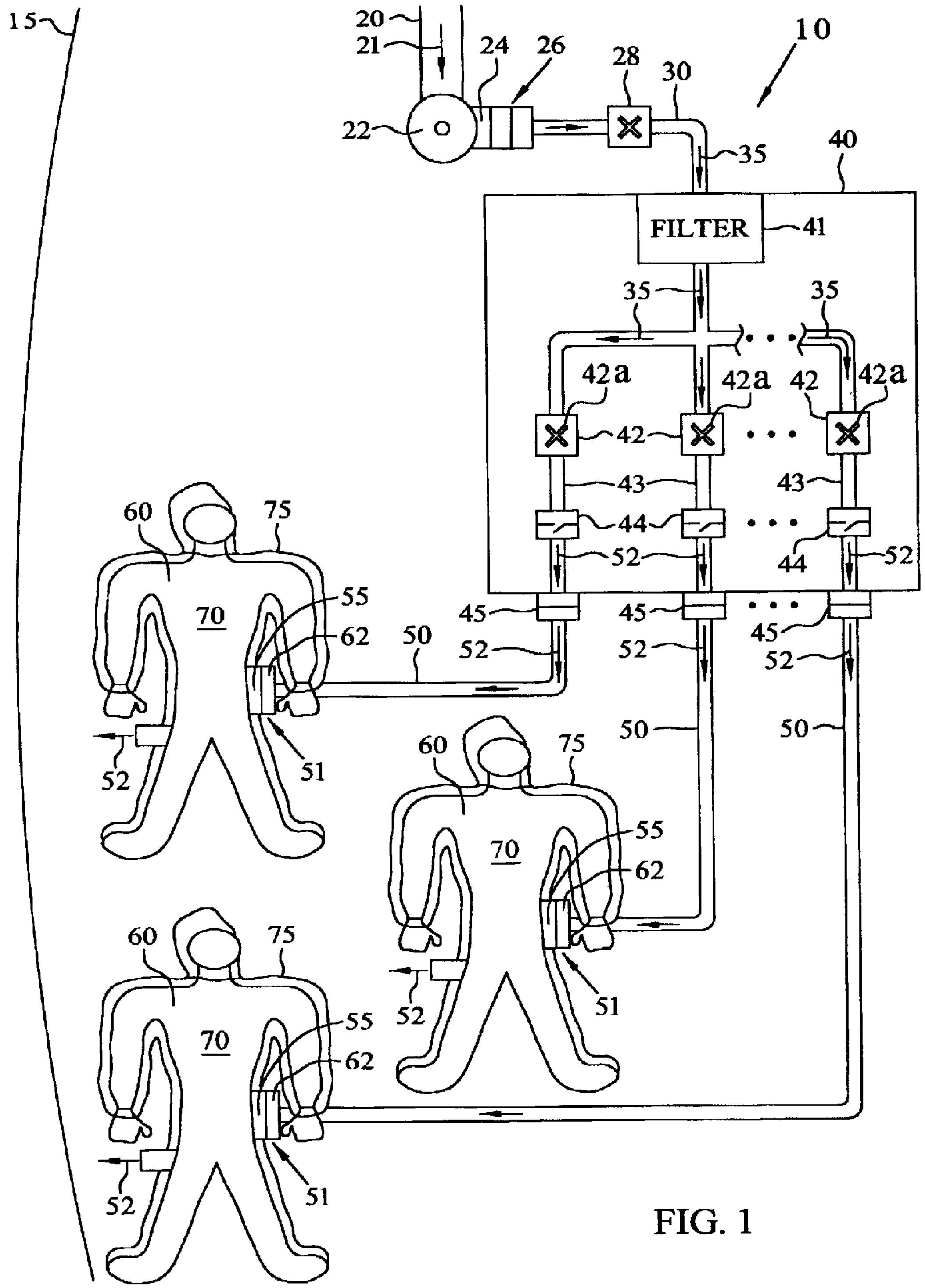
FIG. 1 schematically shows the system of the invention for relieving heat stress for firefighters under intense conditions, such as those endured while fighting fires aboard a ship.

Referring to FIG. 1 of the drawings, cooling system 10 of the invention improves the safety, performance, and comfort of firefighters 70 as they undertake the highly dangerous and demanding task of combating fires aboard a ship 15 at dockside or on the high seas. Usually, these fires are more intense than other fires and must be extinguished quickly and efficiently. Cooling system 10 relieves heat stress of firefighters and contributes to the quick and effective control of onboard fires.

Cooling system 10 makes use of seawater that is widely distributed onboard ship 15 in at least one fire main 20 for fighting fires. Other sources of pressurized cool water could be used such as a chilled water main (freshwater) or the output of what is known as the P-100 pump, which is available on some ships. Fire main 20 typically has fire hose stations 22 extending from it at appropriate intervals throughout ship 15 (only one fire hose station 22 is shown in FIG. 1) to supply significant quantities, or volumes of water (shown as arrow 21) for fighting fires. Typically, the pressure of water 21 in fire main 20 is in the range of about 90–100 psi.

System 10 uses existing resources and infrastructure aboard a ship to reduce additional equipment and cools numbers of firefighters 70 for as long as needed. System 10 is compact to reduce impact on shipboard environment and storage. System 10 interfaces with a hydrant cap 24 on each fire hose station 22 of fire main 20. Hydrant cap 24 is drilled and tapped to accept a quick-disconnect hose coupling 26 which is mated to a manually operated on/off valve 28 connected to a supply hose 30.

Supply hose 30 connected to quick-disconnect hose coupling 26 via valve 28 is robust enough to withstand the operating pressures and volumes of water flowing through it (shown as arrow 35) and the abuse routinely encountered aboard ship and during shipboard fires. Supply hose 30 can be relatively short or can have a sufficient length to extend from fire hose station 22 to a staging area for an attack team of firefighters where the firefighters are on stand-by or at rest prior to reentry where the fire is being combated.

A manifold block 40 is connected to supply hose 30 and receives pressurized water coolant 35 from hose 30 through an in-line filter 41. In-line filter 41 removes particulate matter from the seawater being used as a coolant and reduces fouling from manifold block 40 and other downstream components to be described. Filtered water coolant 35 from filter 41 flows to parallel, manually operated on/off valves 42 that may be actuated by turning handles 42*a* to an on position or off position to allow different numbers of firefighters 70 to receive cooling water. On/off valves 42 are each directly mated to separate in-line flow regulators 44.

In-line flow regulators 44 are used to selectively lower the pressure of water coolant 35 and, consequently, flow rates of water in connector tubes 43 to individual cooling water flows (shown as arrows 52). Typically, in-line flow regulators 44 lower, or reduce the first pressure of water coolant 35 from about 100 psi to flows of coolant 52 at a lower, second pressure of about 10 psi.

Each in-line flow regulator 44 feeds cooling water 52 through a separate quick-disconnect hose coupling 45 on a separate flexible feeder hose 50 that extends to each user, or firefighter 70. Flexible feeder hoses 50 can be long enough to extend from manifold block 40 to near-by users and are made from tough, heat resistant, flexible materials that resist failure as fires in the operating environment. Each feeder hose 50 is coupled to a coupling socket 55 of a quick-disconnect hose coupling 51 that engages a mating coupling plug 62 of quick-disconnect hose coupling 51 on a tube suit 60 worn by firefighter 70. Cooling water, or coolant 52 feeds through each feeder hose 50, passes through quick-disconnect hose coupling 51 (55 and 62), and flows into tube suit 60 to cool firefighter 70.

Tube suit 60 is a commercially available off-the-shelf protective garment that is worn by personnel to provide thermal regulation during exposure to extreme environments. The tube suit is a coverall made of lightweight, durable material. Thermal regulation occurs via a single, long length of thin tubing stitched throughout the inside of the suit. Pressurized fluid (in this case coolant 52) passes through the tubing to create the heat exchange that provides thermal regulation for the user. Tube suits can operate in either a closed circuit or open circuit mode, depending on equipment and the nature and duration of the mission. Tube suits are used for both cooling and heating in a number of maritime and land operations, including warm and cold-water diving and explosive ordnance disposal. Separate, additional equipment to supply pressurized fluid can be purchased and connected to these tube suits for thermal regulation.

In accordance with this invention tube suit 60 is used in cooling system 10 to reduce heat stress for firefighters 70 to improve safety, performance, and comfort in the intense heat of shipboard fires. Tube suit 60 is worn over a firefighter's dungarees or coveralls and under a firefighting ensemble (FFE), a uniform of protective helmet and clothing 75 worn by shipboard firefighter 70. Tube suit 60 uses pressurized water as coolant 52 to remove heat and provide cooling. Tube suit 60 in cooling system 10 could be operated in either the open circuit mode or closed circuit mode. The open circuit mode is shown in the drawing in which expended coolant 52 is exhausted from each tube suit 60 worn by each firefighter 70 to the surrounding ship 15. When operating in the closed circuit mode, each tube suit 60 would have to have another quick-disconnect coupling and return hose (not shown) similar to coupling 51 and feeder hose 50. These components would conduct the expended coolant 52 from each tube suit 60 back to a circulating pump and cooling unit (not shown). While only three firefighters 70 are shown coupled to system 10 of the invention, it is understood that more firefighters 70 might be connected by merely increasing the number of parallel interconnected valves 42 and flow regulators 44 in manifold block 40 for coolant 52 in a like number of feeder hoses 50 to accommodate more users.

Figure 2:
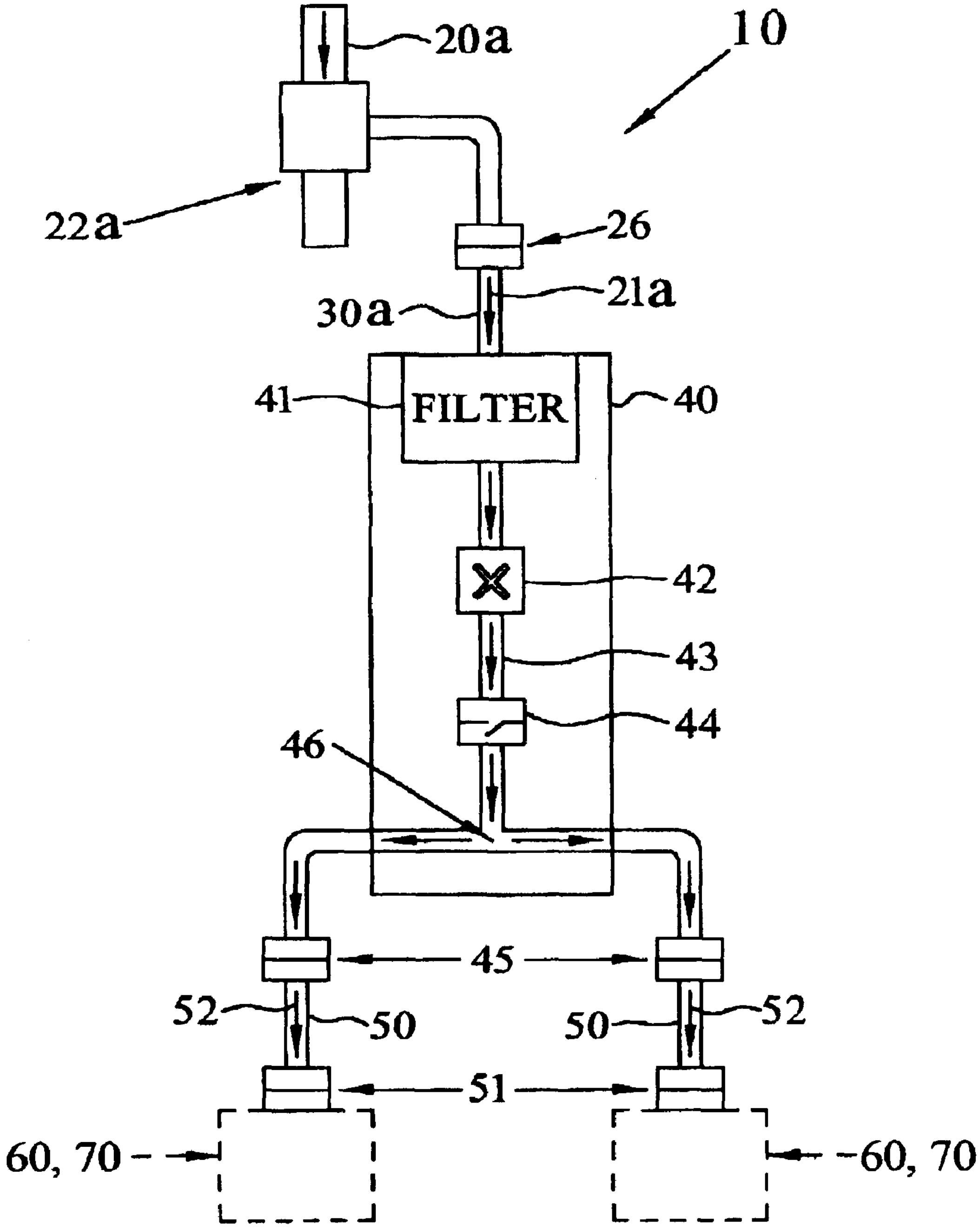
FIG. 2 schematically shows the system of the invention for relieving heat stress for firefighters being coupled at a nozzle of a hose being used to fight fires.

FIG. 2 shows another embodiment of system 10 having quick-disconnect hose coupling 26 coupled to a nozzle 22*a* at the end of a fire hose 20*a* instead of hydrant cap 24. This embodiment of system 10 eliminates the need of a length of supply hose 30*a* to supply pressurized water 21*a* at a first pressure to improve effectiveness and reduce the hazards for firefighters actively combating, or fighting the fire. Manifold block 40 has a filter 41, a single on-off valve 42 and single in-line flow regulator 44 to provide pressurized water 52 at a second, lower pressure. A tee pipe fitting 46 is coupled to single in-line flow regulator 44 and is connected to a pair of quick-disconnect hose couplings 45 joined to a pair of feeder hoses 50. Feeder hoses 50 extend to one or two schematically depicted tube suits 60 worn by a firefighter 70 to connect the tube suit 60 to the little suit the rest of the system. The tee pipe fitting can be eliminated if only a single firefighter 70 in a single tube suit 60 is to be connected, or the feeder section could have more branches with suitable disconnect couplings to accommodate more tube suits and firefighters as desired.

Cooling system 10 of the invention makes use of available pressurized coolant water in a ship fire fighting system to relieve heat stress for improved safety, performance, and comfort of firefighters. The design requires minimal fabrication as it consists mostly of commercial, off-the-shelf components that can be easily interconnected. Individual on/off valves 42 of manifold block 40 allow less than the maximum number of tube suits 70 to be used by merely switching off some of on/off valves 42. In-line flow regulators 44 lower the pressure of coolant 35 upstream to operating pressures in a range that is safe and will not rupture tube suits 60. The pressure of water 21 flowing from ship water main 20 is at about 100 psi, while each tube suit 60 operates with coolant at about 10 psi. The 10 psi pressure level of 52 fed to tube suits 60 is much lower than the pressure level most tube suits 60 are tested to, however, the lower operating pressure provides a safety margin for firefighters wearing tube suits 60. Different pressures than 10 psi can be created by flow regulators 44 and coupled to different firefighters 70. Quick connect/disconnect couplings 45 and 51 at the ends of feeder hoses 50 let firefighters 70 clip in or out of the system as desired. The maximum number of tube suits 60 that could run off of a single manifold block 40 is yet to be determined, but the limiting factor will likely be the number of firefighters 70 fighting the fire, generally 3 to 5 personnel. Currently, the design is an open-circuit system, although this may modified to a closed circuit system as operational requirements are further defined.

Figure 3:
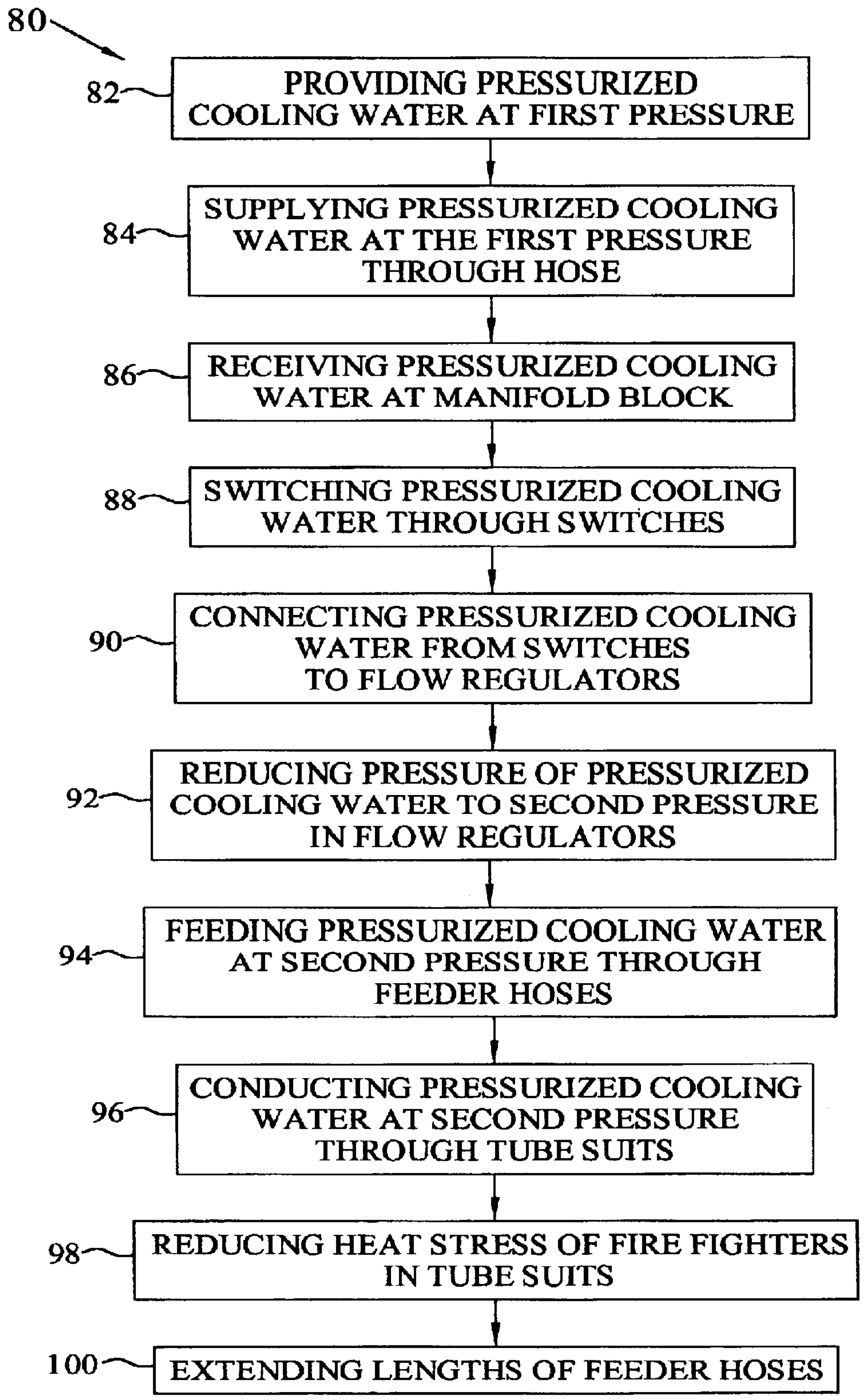
FIG. 3 schematically shows the method of reducing heat stress in firefighters onboard a ship.

Referring to FIG. 3, a method 80 of reducing heat stress in firefighters onboard ship 15 calls for providing 82 cool pressurized water (coolant) 21 at a first pressure from fire main 20 via a fire hose station 22 onboard ship 15. Supplying 84 pressurized cooling water at the first pressure through hose 30 allows receiving 86 the pressurized cooling water at the first pressure from hose 30 at a manifold block 40. Receiving 86 the pressurized cooling water at manifold block 40 permits switching 88 of parts of the pressurized cooling water at the first pressure through one or more on/off valves 42 in manifold block 40. Connecting on/off valves 42 permits reducing pressure 92 of the parts of the pressurized cooling water at the first pressure to a second pressure in one or more flow regulators 44 and feeding 94 the parts of the pressurized cooling water at the second pressure through a plurality of feeder hoses 50.

Conducting 96 the parts of the pressurized cooling water at the second pressure from feeder hoses 50 through a plurality of tube suits 60 each worn by a firefighter 70 assures the reducing 98 of heat stress and the possible injury of each firefighter 70 in each tube suit 60 by the conducted parts of pressurized cooling water at the second pressure. Extending 100 the lengths of feeder hoses 50 permits each firefighter 70 to continuously receive cooling water through each tube suit 60 while waiting or resting nearby at an outlying location.

Having the teachings of this invention in mind, modifications and alternate embodiments of cooling system 10 and its method 80 may be adapted without departing from the scope of the invention. Its use of commercially available off-the-shelf components, long proven to operate successfully, makes it cost effective and reliable method to reduce the extreme hazards associated with fighting fires on ships. Although cooling system 10 has been described in regard to shipboard fires, it is capable of reliable use in other environments both on open water and on land. Cooling system 10 could also be adapted for cooling personnel elsewhere on a ship, such as diver tenders. The uncomplicated design of cooling system 10 makes it adaptable to reducing heat stress for different numbers of firefighters 70 in other environments where a pressurized form of cooling fluids are available and heat stress needs to be dealt with, such as in mines and other work areas underground. The off-the shelf components of cooling system 10 are available in materials that are rugged and corrosion resistant, allowing long-term use in a saltwater environment. System 10 can accommodate more or less firefighters 70 and be ruggedly fabricated from a wide variety of materials to assure resistance to corrosion and sufficient strength for long term, reliable operation under a multitude of different operational requirements including saltwater environments.

The disclosed components and their arrangements as disclosed herein, all contribute to the novel features of this invention. Cooling system 10 is effective to reduce heat stress and thereby improve the safety, performance, and comfort of firefighters 70 onboard ships 15. Therefore, cooling system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

What is claimed is:

1. A method of reducing heat stress in firefighters onboard a ship comprising the steps of:

providing a source of said pressurized cooling water at a first pressure from a shipboard pressurized water source;

supplying said pressurized cooling water at said first pressure through a supply hose;

switching portions of said pressurized cooling water at said first pressure through a plurality of on/off switches in a manifold block;

reducing pressure of said portions of said pressurized cooling water at said first pressure to a second pressure in a plurality of parallel in-line flow regulators;

feeding said portions of said pressurized cooling water at said second pressure through a plurality of feeder hoses connected to said in-line flow regulators;

conducting said portions of said pressurized cooling water at said second pressure from said feeder hoses through a plurality of tube suits each worn by a firefighter; and reducing heat stress of each firefighter in each tube suit by said conducted portions of said pressurized cooling water at said second pressure.

2. The method of claim 1 further comprising the step of:

coupling quick-disconnect couplings between said supply hose and said shipboard pressurized water source, said feeder hoses and said manifold block, and said feeder hoses and said tube suits.

3. The method of claim 1 further comprising the steps of:

receiving said pressurized cooling water at said first pressure from said supply hose at said manifold block; and connecting said portions of said pressurized cooling water at said first pressure through connector tubes coupled between said on/off switches and flow regulators.

4. The method of claim 3 further comprising the step of:

extending the lengths of said feeder hoses to permit each firefighter to receive cooling water through each tube suit for said step of reducing heat stress.

5. The method of claim 4 wherein said second pressure of said step of reducing can be different for different ones of said flow regulators.

6. The method of claim 5 further comprising the step of:

coupling quick-disconnect couplings between said supply hose and said shipboard pressurized water source, said feeder hoses and said manifold block, and said feeder hoses and said tube suits.

7. The method of claim 6 wherein said step of providing comprises the step of connecting said supply hose to a fire main for fighting fires onboard a ship.

8. The method of claim 7 wherein said step of providing comprised the step of connecting said supply hose to receive said pressurized cooling water at said first pressure at a nozzle being used to fight a fire.

9. A method of reducing heat stress in at least one firefighter onboard a ship comprising the steps of:

reducing pressure the of pressurized cooling water received from a shipboard pressurized water source at a first pressure to a second pressure in an in-line flow regulator;

feeding said pressurized cooling water at said second pressure through a feeder hose connected to said in-line flow regulator;

conducting said pressurized cooling water at said second pressure from said feeder hose through a tube suit worn by a firefighter; and transferring heat by said tube suit between said firefighter and said conducted pressurized cooling water at said second pressure.

10. The method of claim 9 further comprising the steps of:

supplying said pressurized cooling water at said first pressure through a supply hose;

switching said pressurized cooling water at said first pressure through an on/off switch in a manifold block; and connecting said switched pressurized cooling water at said first pressure through a connector tube coupled between said on/off switch and said in-line flow regulator.

11. The method of claim 10 further comprising the step of:

extending the length of said feeder hose to permit said firefighter to receive cooling water through said tube suit for said step of reducing heat stress while fighting fires and while on standby.

12. The method of claim 10 further comprising the step of:

coupling quick-disconnect couplings between said supply hose and said shipboard pressurized water source, said feeder hose and said manifold block, and said feeder hose and said tube suit.

13. The method of claim 12 further comprising the step of:

providing a source of said pressurized cooling water at said first pressure in a fire main for fighting fires onboard a ship.

14. The method of claim 12 further comprising the step of:

providing a source of said pressurized cooling water at said first pressure at a nozzle being used to fight a fire.

15. The method of claim 14 further comprising the step of:

coupling a T-branch feeder section to said in-line flow regulator.

16. The method of claim 15 further comprising the steps of:

connecting said T-branch feeder section a pair of quick-disconnect hose couplings; and joining each of said pair of quick-disconnect hose couplings each to a separate feeder hose each extending to a separate tube suit.

17. A system for reducing heat stress in at least one shipboard firefighter comprising:

means for providing pressurized cooling water at a first pressure onboard a ship;

means connected to said pressurized cooling water providing means for reducing pressure of said pressurized cooling water at said first pressure to a second pressure;

means coupled to said pressure reducing means for feeding said pressurized cooling water at said second pressure;

means connected to said feeding means for conducting said pressurized cooling water at said second pressure over a firefighter to reduce heat stress of said firefighter.

18. The system of claim 17 wherein said reducing pressure means is an in-line flow regulator, said feeding means is a feeder hose and said conducting means is a tube suit worn by said firefighter.

19. The system of claim 18 further comprising:

a supply hose connected to said pressurized cooling water providing means to contain said pressurized cooling water at said first pressure;

a manifold block connected to said hose having an on/off switch; and a connector tube coupled to said on/off switch and said flow regulator to connect said switched pressurized cooling water at said first pressure therethrough.

20. The system of claim 18 further comprising:

a plurality of on/off switches in said manifold block;

a plurality of parallel in-line pressure regulators in said manifold block, each of said in-line pressure regulators being coupled to a separate one of said plurality of on/off switches;

a plurality of feeder hoses each being coupled to one of said parallel in-line pressure regulators in said manifold block by a quick-disconnect coupling; and a plurality of tube suits each being coupled to a separate one of said feeder hoses by a quick-disconnect coupling.

21. The system of claim 20 further comprising:

a plurality of quick-disconnect couplings, a separate one of which each being connected between said supply hose and said shipboard pressurized water source, between each of said feeder hoses and said manifold block, and between each of said feeder hoses and each of said tube suits.

22. The system of claim 21 wherein said pressurized cooling water providing means is comprised of a fire main for fighting fires onboard a ship.

23. The system of claim 18 wherein said pressurized cooling water providing means is comprised of a nozzle being used to fight a fire.

24. The system of claim 23 further comprising:

a T-branch feeder section coupled to said in-line flow regulator.

25. The system of claim 24 further comprising:

a pair of quick-disconnect hose couplings; and a pair of feeder hoses each extending to a separate tube suit, said T-branch feeder section being connected to said pair of quick-disconnect hose couplings and said feeder hoses being connected to said pair of quick-disconnect hose couplings.

* * * * *